June 2, 1970  H. C. KENT  3,515,161
FLOW CONTROL APPARATUS
Filed May 6, 1968
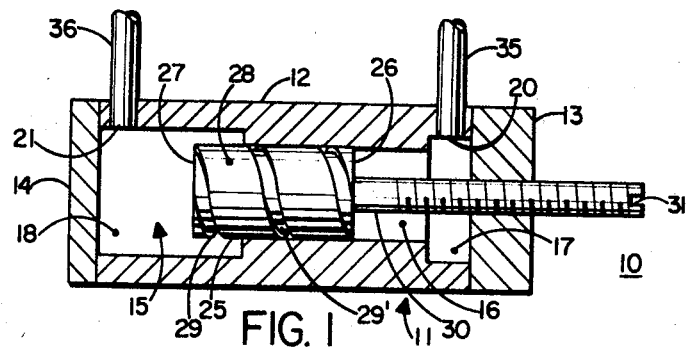
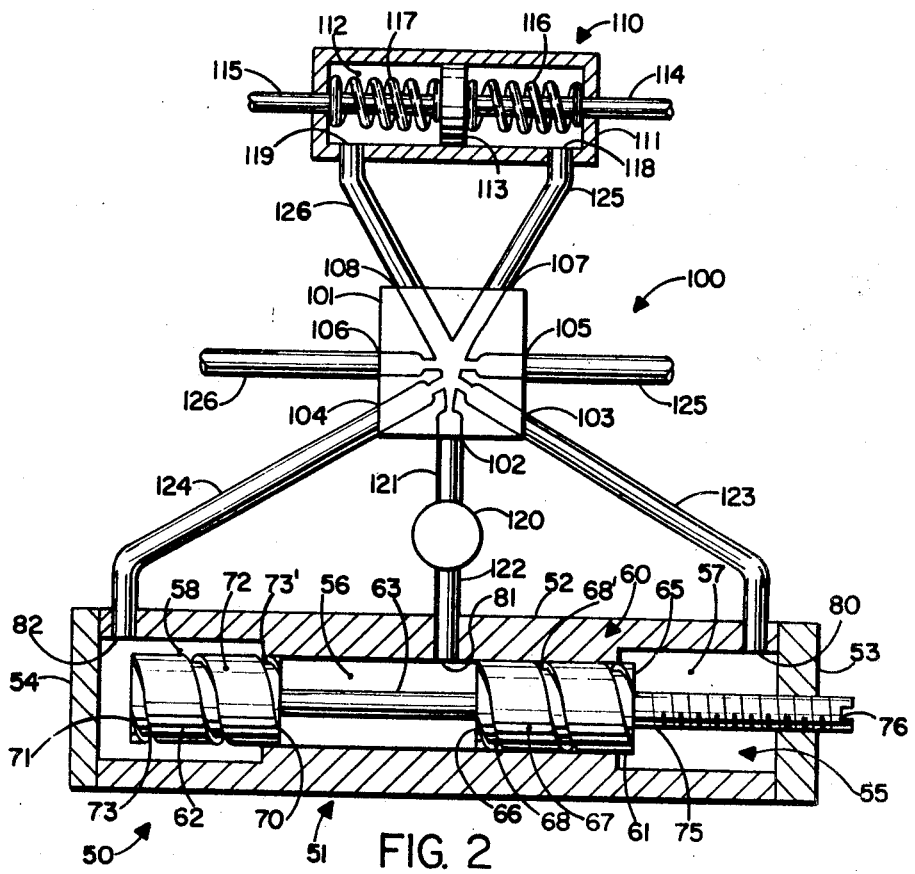
INVENTOR.
HOLGER C. KENT United States Patent Office 3,515,161
Patented June 2, 1970

3,515,161
FLOW CONTROL APPARATUS
Holger C. Kent, Anoka, Minn., assignor to Honeywell Inc., Minneapolis, Minn., a corporation of Delaware
Filed May 6, 1968, Ser. No. 726,900
Int. Cl. F15c 1/14, 3/02
U.S. Cl. 137—81.5
6 Claims

ABSTRACT OF THE DISCLOSURE

A flow controller comprising a capillary passage of variable length formed by a channel in the side of a piston which is partially located within a cylindrical chamber. Impedance to flow through the controller is varied by varying the portion of the piston which is within the chamber, thus varying the length of the passage The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The invention herein described relates generally to fluid handling apparatus and more specifically to fluid flow control devices.

In many fluid circuits and systems it is necessary to include means for providing small, but critical, smoothly variable adjustments to fluid flow rates. This function has frequently been accomplished in the prior art by means of flow adjusters which have taken the form of needle valves. A needle valve generally comprises a cone-shaped armature which is movable relative to a valve seat. Flow through a needle valve is controlled by moving the armature toward or away from the valve seat, thus decreasing or increasing the cross sectional area of the passage through which the fluid must flow.

It has been found that it is difficult to construct needle valves having fine, smoothly variable adjustment capabilities. The reasons for this, in part, stem from the facts that in order to obtain such adjustment capabilities, the relative geometries of the armature and the valve seat are critical, the centering of the armature with respect to the valve seat is critical and means must be provided for moving the armature relative to the valve seat by very small and precise amounts.

In addition to the previously discussed requirement for flow control means, many fluidic systems also require input means capable of providing small, smoothly adjustable fluid flow differential input signals. The requirement for flow differential signals exists because most fluid systems operate in a push-pull mode and the input signals take the form of biasing signals supplied to opposing control ports of a fluid amplifier in the system. According to prior art teachings, input signals are frequently produced by means of a flow divider comprising an assembly including two needle valves which are interconnected such that they operate in opposite senses. An inlet to each of the needle valves is supplied with fluid from a common source. The outlets of the needle valves are connected to opposing control ports of a fluid amplifier in the system. Interconnecting links between the needle valves cause the armature of one valve to move toward its valve seat as the armature of the other valve is moved away from its valve seat. Thus, the cross-sectional area of the passage through which fluid must flow to one control port of the amplifier increases as the cross-sectional area of the passage through which fluid must flow to the opposing control port decreases. Accordingly, this needle valve assembly provides a fluid flow differential signal to the amplifier.

The problems present in constructing a needle valve for the previously described flow adjuster are also present in constructing each of the needle valves for the ffow divider. In addition, the needle valves in the flow divider must be carefully matched to provide substantially identical flow control characteristics. Further, the apparatus for interconnecting the needle valves in the flow divider assembly must be capable of imparting small, smoothly variable, equal displacements of opposite senses to the armatures of the needle valves relative to their respective valve seats.

In accordance with prior art teachings both flow adjuster and the flow divider are assembled from numerous small machined parts. The machining of these parts is critical, time consuming and expensive. In addition, substantial time is required for assembly of the parts. It is, therefore, apparent that prior art flow adjusters and flow dividers do not meet the existing need for simple, reliable, easily manufactured flow control devices which are capable of very small, smoothly variable adjustments to fluid flow rates.

SUMMARY OF THE INVENTION

The applicant's fluid flow adjuster comprises a pair of fluid ports, means defining a capillary passage of variable length connecting the ports and means for varying the length of the capillary passage. For the purpose of this specification, a capillary passage is defined to be a passage of sufficiently small cross-sectional area that an appreciable pressure drop due to viscous losses occurs in fluid flowing therein. The pressure drop, and consequently the impedance to fluid flow, provided by the capillary passage varies directly as the length of the passage. Accordingly, as the passage is lengthened, its impedance to fluid flow increases and as the passage is shortened, its impedance to fluid flow decreases.

In accordance with the teachings of this invention the applicant's unique flow adjuster can be easily and economically constructed from common materials using only simple, easily automated and well-known manufacturing techniques. Further, a minimum number of easily assembled parts is required, thus minimizing assembly time and cost. In addition, a plurality of the applicant's flow adjusters can be simply and easily incorporated into a single integrated structure to provide flow dividers and other specialized flow control devices.

Flow control devices according to the applicant's teachings are capable of providing very fine, smoothly variable adjustments to fluid flows therethrough. In addition, flow dividers, comprising at least two flow adjusters according to the applicant's teachings, are capable of providing fine, smoothly adjustable flow differential output signals.

BRIEF DESCRIPTION OF THE DRAWING

FIG. 1 is a sectional view of a fluid flow adjuster in accordance with the applicant's invention; and FIG. 2 is a sectional view of a fluid system including a fluid flow divider according to the teachings of the applicant's invention.

DESCRIPTION OF THE PREFERRED EMBODIMENTS

In FIG. 1, reference numeral 10 generally refers to a fluid flow adjuster according to the teachings of the applicant's invention. Flow adjuster 10 comprises a housing 11 which includes a body member 12, a first end cap 13 and a second end cap 14.

End caps 13 and 14 are shown as being attached to body member 12 by means of adhesives. It is, however, apparent that the end caps can be attached to the body member equally as well by other means. For example, small screws extending through the end caps into the body member can be used. Alternatively, portions of the end caps and the ends of the body member can be provided with mating threads whereby they can be assembled.

Housing 11 has a chamber 15 therein which includes a central cylindrical portion 16, a first end portion 17 and a second end portion 18. End portion 18 has a larger cross-sectional area than the cross-sectional area of central portion 16. End portion 17 is also shown as having a larger cross-sectional area than the cross-sectional area of central portion 16, however, this is not necessary for proper operation of flow adjuster 10. Housing 11 also contains a first port 20 in communication with end portion 17 and a second port 21 in communication with end portion 18.

A piston 25 is located generally within central portion 16 of chamber 15. Piston 25 is sized to fit snugly within portion 16 and is slidable therewithin. Piston 25 has a first end wall 26, a second end wall 27 and a side wall 28. Side wall 28 contains a channel 29 extending between end wall 26 and end wall 27. A capillary passage 29' is formed by the portion of channel 29 which lies within central portion 16 of chamber 15.

Piston 25 is shown as being round in cross section and channel 29 is shown as having a helical configuration. However, this particular geometry is not necessary for the applicant's invention. Piston 25 may have any other convenient cross-sectional shape. Further, channel 29 may take any convenient path provided it extends between end wall 26 and end wall 27. It is, however, pointed out that piston 25 can be very conveniently manufactured with a round cross-sectional shape. Further, channel 29, which must generally be of very small and uniform cross-sectional dimensions along its entire length, can be formed simply and inexpensively by means of standard and well-known screw machine techniques if piston 25 has a round cross-sectional shape and channel 29 is made in a helical configuration.

A projection 30 is shown attached to end wall 26 of piston 25. Projection 30 extends through end cap 13 of housing 11. A portion of projection 30 is threaded. The threads on projection 30 mate with threads in end cap 13. In addition, the outer end of projection 30 is provided with a slot 31 so that projection 30 can be easily turned by means of a screwdriver. It will, however, be apparent to those skilled in the art that other means for turning projection 30 will function equally as well. For example, the outer end of projection 30 may be provided with a knob or a thumbwheel.

In operation, flow adjuster 10 is connected to a larger circuit or system wherein a manual means for providing flow adjustment is required. For the purpose of discussing the opeartion of flow controller 10, it will be assumed that fluid port 20 is connected to an upstream or supply portion of a fluid circuit (not shown) by means of a conduit 35 whereby it is supplied with fluid signals. It will further be assumed that fluid port 21 is connected to a downstream or receiving portion of the circuit (not shown) to which fluid signals are supplied by means of a conduit 36. Thus, the fluid signals flow from the upstream portion of the circuit, through flow adjuster 10, and to the downstream portion of the circuit. In flowing through flow adjuster 10, the fluid signals must pass through capillary passage 29 Flow through such a passage is given by the relationship, $$a_x = \frac{K \Delta p D^4}{L}$$

where:
$a_x$ is the rate of flow the passage,
K is a factor not dependent on the dimensions of the passage,
$\Delta p$ is the pressure differential across the passage,
D is the hydraulic diameter of the passage, and
L is the length of the passage.

The factor K is dependent on the temperature of the fluid within the passage. However, for the purpose of the following discussion, it will be assumed that the temperature is constant, thus making K a constant. The hydraulic diameter is given for passages of non-circular cross-section by the expression, $D = 4A/d$ where A is the cross-sectional area of the passage and $d$ is the cross-sectional perimeter of the passage. Since passage 29' has a uniform cross section along its entire length, flow therethrough is a function of only its length and the pressure differential thereacross. For the purpose of discussing the operation of flow adjuster 10, it will be assumed that the pressure differential $\Delta p$ thereacross is constant. Accordingly, it can be seen that flow through flow adjuster 10 varies inversely as the length of passage 29'.

The length of passage 29' is dependent on the portion of piston 25 which is within central portion 16 of chamber 15. Since piston 25 is slideable within chamber 15 and end portion 18 has a larger cross-sectional area than the cross-sectional area of central portion 16, a variable portion of piston 25 can be slid from central portion 16 into end portion 18. Further, if flow adjuster 10 is constructed such that the length of end portion 18 is equal to the length of piston 25, the entire length of piston 25 can be moved from central portion 16 into end portion 18. Accordingly, the length of passage 29' can be continuously varied from a maximum length equal to the total length of channel 29 in piston 25 to a minimum zero length. In accordance with the previously discussed flow relationship, the maximum length of passage 29', resulting from piston 25 being entirely located within central portion 16, results in a minimum flow through flow adjuster 10. Conversely, a zero length of passage 29', resulting from piston 25 being located entirely within end portion 18, results in a maximum flow through flow adjuster 10.

End cap 13 and projection 30 comprise means for moving piston 25 within chamber 15. Projection 30 may be either rigidly or rotatably attached to piston 25. Since end wall 13 and projection 30 include mating threads, rotation of projection 30 results in linear movement thereof along the central axis of chamber 15. This movement is imparted to piston 25, thereby displacing it within chamber 15 and varying the portion thereof within central portion 16.

It should be noted that a complete rotation of projection 30 results in a relatively small linear movement thereof along the central axis of chamber 15. Further, the threads on projection 30 and in end cap 13 may be made as fine as necessary to give the desired resolution to flow adjuster 10. In addition, it should be noted that with channel 29 formed in a helical configuration on piston 25 as shown in FIG. 1, a relatively long channel may be provided on a short piston. Accordingly, resolution of flow adjuster 10 can be further increased. A further advantage is that since a short piston can be used, the overall size of flow adjuster 10 can be minimized.

It is pointed out that if the temperature of the fluid within passage 29' and the pressure differential $\Delta p$ thereacross are constant, the location of piston 25 within chamber 15 can be calibrated in terms of the flow rate $a_x$ through flow adjuster 10. Although not shown, a flow rate readout can be implemented by attaching an indicator to the outer end of projection 30. Accordingly, the applicant's flow adjuster can be utilized as a flow meter.

Reference is now made to FIG. 2 wherein reference numeral 50 generally refers to a fluid flow divider according to the teachings of the applicant's invention and reference numeral 100 generally refers to fluid operated means associated therewith. Flow divider 50 comprises a housing 51 which includes a body member 52, a first end cap 53 and a second end cap 54. End caps 53 and 54 are shown as being attached to body member 52 by means of adhesives. It is, however, apparent that the end caps can be attached to the body member equally well by other means. For example, small screws extending through the end caps and into the body member can be used. Alternately, portions of the end caps and the ends of the body member can be provided with mating threads whereby they can be assembled.

Housing 51 has a chamber 55 therein which includes a central cylindrical portion 56, a first end portion 57 and a second end portion 58. End portions 57 and 58 have larger cross-sectional areas than the cross-sectional area of central portion 56. Housing 51 also contains a first port 80 in communication with first end portion 57, a second port 82 in communication with second end portion 58, and a third port 81 in communication with central portion 56.

A spool-shaped element 60 is located generally within central portion 56 of chamber 55. Spool-shaped element 60 comprises a first piston 61, a second piston 62 and a rod 63 which connects pistons 61 and 62. Pistons 61 and 62 are sized to fit snugly within central portion 56 of chamber 55. Spool-shaped element 60 is slideable along the central axis of chamber 55.

Piston 61 has a first end wall 65, a second end wall 66 and a side wall 67. Side wall 67 contains a channel 68 extending between end wall 65 and end wall 66. A first capillary passage 68' is formed by the portion of channel 68 which lies within central portion 56 of chamber 55.

Piston 62 has a first end wall 70, a second end wall 71 and a side wall 72. Side wall 72 contains a channel 73 extending between end wall 71 and end wall 72. A capillary passage 73' is formed by the portion of channel 73 which lies within central portion 56 of chamber 55.

Pistons 61 and 62 are shown as being round in cross section and channels 68 and 73 are shown as having helical configurations. However, this particular geometry is not necessary for the applicant's invention. Pistons 61 and 62 may have any other convenient cross-sectional shape. Further, channel 68 may take any convenient path between end wall 65 and end wall 66. Likewise, channel 73 may take any convenient path between end wall 70 and end wall 71. However, as was pointed out in connection with flow adjuster 10, spool-shaped element 60 can be very conveniently manufactured with a round cross-sectional shape. Further channels 68 and 73, which must generally be of very small and uniform cross-sectional dimensions along their entire lengths, can be formed simply and inexpensively by means of standard and well-known screw machine techniques, if pistons 61 and 62 have round cross-sectional shapes and channels 68 and 73 are made in a helical configuration.

A projection 75 is shown attached to end wall 65 of piston 61. Projection 75 extends through end cap 53 of housing 51. A portion of projection 75 is threaded. The threads on projection 75 mate with threads in end cap 53. The outer end of projection 75 is provided with a slot 76 so that projection 75 can be easily turned by means of a screwdriver. It will, however, be apparent that other means for turning projection 75 will function equally as well. For example, the outer end of projection 75 may be provided with a knob or a thumbwheel.

Fluid operated means 100 is shown as comprising a proportional fluid amplifier 101 and an actuator 110. Amplifier 101 includes a power nozzle 102, a first pair of opposing control ports 103 and 104, a second pair of opposing control ports 105 and 106, a first outlet passage 107 and a second outlet passage 108.

Power nozzle 102 and port 81 of flow divider 50 are adapted to be supplied with fluid under pressure from a fluid source 120 by means of conduits 121 and 122. Control port 103 is connected to port 80 of flow divider 50 by means of a conduit 123. Control port 104 is connected to port 82 of flow divider 50 by means of a conduit 124. Control ports 105 and 106 may be connected to any suitable source (not shown) of pressure differential signals by means of conduits 125 and 126. The source of pressure differential signals may, for example, be a portion of a larger fluidic control circuit.

Actuator 110 is shown as comprising a housing 111 and having a cylindrical chamber 112 therewithin. Chamber 112 contains a piston 113 which is adapted to slide along the central axis of chamber 112. A first connecting rod 114 is attached to one side of piston 113 and extends through one end wall of housing 111. A second connecting rod 115 is attached to the other side of piston 113 and extends through the second end wall of housing 111. A pair of springs, 116 and 117, are located between the sides of piston 113 and the corresponding end walls of housing 111. Springs 116 and 117 are shown as being substantially identical, thus biasing piston 113 to the center of chamber 112.

Housing 111 also contains a pair of pressure ports 118 and 119 located proximate the end walls of housing 111. Pressure port 118 communicates with the portion of chamber 112 on one side of piston 113. Pressure port 119 communicates with the portion of chamber 112 on the other side of piston 113. Pressure ports 118 and 119 are connected to outlet passages 107 and 108 of fluid amplifier 101 by means of conduits 125 and 126. Connecting rods 114 and 115 are adapted to connect piston 113 to any desired means for utilizing the mechanical output provided by actuator 110. The utilization means may, for example, be an aircraft control surface.

The operation of flow divider 50 will be explained in connection with a fluidic aircraft control system. For the purpose of the following explanation, it will be assumed that actuator 110 is a rudder actuator for the rudder of a light aircraft. Accordingly, connecting rods 114 and 115 are connected to the aircraft rudder by any suitable means such as an arrangement of cables, pulleys, and levers. It will further be assumed that control ports 105 and 106 of fluid amplifier 101 are connected to receive rudder control signals from a fluidic control circuit which accepts one or more rudder command inputs. These command inputs may include direct inputs from the pilot and inputs from an autopilot system.

Amplifier 101 operates such that when power nozzle 102 is connected to a source of fluid under pressure, it is caused to issue a stream of fluid which may be received in varying proportions by outlet passages 107 and 108. In the absence of a pressure differential signal between opposing control ports, a fluid stream issuing from power nozzle 102 will be substantially equally divided between outlet passages 107 and 108, and substantially equal pressures will be produced therein. However, if a pressure differential signal is supplied to the first pair of opposing control ports such that the pressure at control port 103 is greater than the pressure at control port 104, the pressure produced in outlet passage 108 will be greater than the pressure produced in outlet passage 107. Conversely, if the pressure at control port 104 is greater than the pressure at control port 103, the pressure produced in outlet passage 107 will be greater than the pressure produced in outlet passage 108. Similarly, if the pressure supplied to control port 105 is greater than the pressure supplied to control port 106, the pressure produced in outlet passage 108 will be greater than the pressure produced in outlet passage 107. If the pressure supplied to control port 106 is greater than the pressure supplied to control port 105, the pressure produced in outlet passage 107 will be greater than the pressure produced in outlet passage 108.

Power nozzle 102 is connected to a source 120 of fluid under pressure by means of conduit 121 whereby it is caused to issue a stream of fluid which is received by outlet passages 107 and 108. Fluid source 120 is also connected to port 81 of flow divider 50 by means of conduit 122 whereby central portion 56 of chamber 55 is supplied with fluid under pressure. For purposes of the following discussion, it will be assumed that spool-shaped element 60 is initially centered within chamber 55. Accordingly, equal portions of pistons 61 and 62 are located within central portion 56 of chamber 55. Therefore, capillary passages 68' and 73' are of equal lengths. Each of capillary passages 68′ and 73′ thus has equal flow therethrough and an equal pressure drop thereacross. Accordingly, the pressures produced in end portions 57 and 58 of chamber 55 are equal. The pressures in end portions 57 and 58 are transmitted to control ports 103 and 104 of amplifier 101 by means of conduits 123 and 124. Since these pressures are equal, no pressure differential signal exists between control ports 103 and 104, and no effect is produced on the proportions of the stream issuing from power nozzle 102 which are received by outlet passages 107 and 108.

Under normal straight and level flight conditions where no disturbing factors, such as crosswinds, are present and no change in flight pattern is commanded either by the pilot or the autopilot, no pressure differential signals will be transmitted to control ports 105 and 106 from the control system through conduits 125 and 126. Accordingly, the signals at control ports 105 and 106 have no effect on the proportions of the stream issuing from power nozzle 102 which are received by outlet passages 107 and 108. Thus, outlet passages 107 and 108 receive fluid at equal rates and equal pressures are produced therein. The equal pressures in outlet passages 107 and 108 are transmitted to opposite sides of piston 113 in chamber 112. Since the pressures on opposite sides of piston 113 are equal, no effect on the position of piston 113 is produced, and piston 113 remains substantially centered within chamber 112. Accordingly, the aircraft rudder is maintained in a position aligned with the longitudinal aircraft axis.

If, however, a disturbing factor such as a crosswind is present, it is necessary to compensate for such disturbing factor by offsetting the rudder alignment with respect to the longitudinal axis of the aircraft. This can be done by means of an appropriate input to the control circuit from the pilot or the autopilot system. If, however, the disturbance is constant, it is advantageous to provide separate means for supplying the compensation signal so that biased operation of the control circuit is not required.

It is pointed out that in actual practice, amplifier 101 may actually comprise a cascade of amplifiers or a high gain amplification circuit. Acordingly, a very small pressure differential input signal will cause a large pressure differential output signal between outlet passages 107 and 108. Accordingly, any means provided for supplying a separate compensating bias signal must be capable of producing very small and smoothly variable pressure differentials. The applicant's controller is capable of producing such signals as follows. Assume that the necessary rudder compensation requires that piston 113 be slightly to the right of the center of chamber 112. This result can be produced by providing a pressure differential across piston 113 such that the pressure on the left of piston 113 is greater than the pressure on the right of piston 113. This requires that amplifier 101 be biased such that a greater pressure is produced in outlet passage 108 than in outlet passage 107. Amplifier 101 can be so biased by providing a biasing signal at the first pair of opposing control ports such that the pressure at control port 103 is slightly greater than the pressure at control port 104. The pressures at control ports 103 and 104 are the same as the pressures in end portions 57 and 58 of chamber 55 in flow controller 50. The pressures in end portions 57 and 58 are dependent on the pressure drops across capillary passages 68′ and 73′. As previously discussed, the pressure drop across a capillary passage such as capillary passages 68′ and 73′ is directly dependent on the length of the passage. Accordingly, the pressure in end portion 57 can be made greater than the pressure in end portion 58 by moving spool-shaped element 60 to the right within chamber 55, thus shortening passage 68′ and lengthening passage 73′. Assuming that projection 75 and end cap 53 are provided with right hand threads, spool-shaped element 60 can be moved to the right by rotating projection 75 to the left. As previously discussed in connection with flow adjuster 10, the threads included on projection 75 and in end cap 53 can be made with any desired pitch so as to provide flow divider 50 with the necessary resolution. In addition, by forming channels 68 and 73 in a helical configuration in pistons 61 and 62, the channels can be made of considerable length relative to the dimensions of flow controller 50. This configuration of channels 68 and 73 further increases the resolution possible with a flow controller of the applicant's design.

By similar analysis, it can be seen that if the necessary rudder compensation requires that piston 113 be located slightly to the left of the center of chamber 112, amplifier 101 must be biased such that the pressure produced in outlet passage 107 is greater than the pressure produced in outlet passage 108. This result can be produced if a biasing signal is supplied to the first pair of opposing control ports such that the pressure at control port 104 is greater than the pressure at control port 103. Such a biasing signal can be accomplished by moving spool-shaped elements to the left within chamber 55, thus shortening passage 73′ and lengthening passage 68′. Assuming right hand threads are provided on projection 75 and in end cap 53, spool-shaped element 60 can be moved to the left by rotating projection 75 to the right.

Operation of the applicant's flow divider has been described and discussed with regard to only one application wherein a flow divider capable of a very small and smoothly variable division of flow therethrough is required. It has been shown that the applicant's flow adjuster and flow divider are capable of providing such very small and smoothly variable adjustments to fluid flows and pressures. It has further shown that these characteristics can be produced by small, simple and economical devices. A wide range of applications in a variety of fluidic circuits and systems will be apparent to those skilled in the fluidics art. It is pointed out that the applicant's flow adjuster and flow divider can be tailored to meet a wide range of requirements. Reference is made to the previously set forth mathematical flow relationship from which it can be seen that flow through a capillary passage varies as the fourth power of the hydraulic diameter of the passage. Accordingly, as the hydraulic diameter of the passage is made greater than unity, flow through the passage increases very rapidly. Conversely, as the hydraulic diameter of the passage is made less than unity, flow through the passage decreases very rapidly. Thus, flow controllers in accordance with the applicant's unique design are adaptable to the wide range of flow rate and impedance requirements simply by choosing appropriate hydraulic diameters and lengths for the capillary passages therein.

Although the applicant's invention has been described and illustrated in detail, it should be understood that the same is by way of illustration and example only and is not to be taken by way of limitation. The spirit and scope of this invention are limited only by the terms of the following claims.

What is claimed is:
1. A flow controller comprising:
   a housing defining a chamber including a cylindrical portion and first and second end portions having larger cross-sectional areas than the cross-sectional area of the cylindrical portion, said housing further defining a first port in fluid communication with the first end portion, a second port in fluid communication with the cylindrical portion and a third port in fluid communication with the second end portion;
   a first piston located generally within the cylindrical portion of the chamber between the first and second ports, said first piston including a side wall and first and second end walls, the side wall including a channel therein having first and second ends terminating respectively at the first and second end walls;
   a second piston located generally within the cylindrical portion of the chamber between the second and third ports, said second piston including a side wall and first and second end walls, the side wall including a channel therein having first and second ends terminating respectively at the first and second end walls, the first end portion of the chamber in said housing providing fluid communication between the first end of the channel in said first port, the second end portion of the chamber in said husing providing fluid communication between the second end of the channel in said second piston and the third port; and means for displacing said first and said second pistons within the chamber so that the portion of said first piston within the cylindrical portion of the chamber varies inversely as the portion of said second piston within the cylindrical portion of the chamber.

2. The flow controller of claim 1 wherein:

the cylindrical portion of the chamber in said housing is circular in cross section;

said first piston is circular in cross section;

said second piston is circular in cross section; and the first and second channels in the side walls of said first and said second pistons are helical in configuration.

3. A fluid flow divider comprising:

a housing having a chamber therein, the chamber comprising a cylindrical portion, a first end portion and a second end portion, the cross-sectional areas of the first and second end portions being larger than the cross-sectional area of the cylindrical portion, said housing further including a first fluid passage communicating with the first end portion of the chamber, a second fluid passage communicating with the cylindrical portion of the chamber and a third fluid passage communicating with the second end portion of the chamber;

a spool-shaped element located generally within the cylindrical portion of the chamber, said spool-shaped element comprising first and second pistons and connecting means interconnecting the first and second pistons, the first and second pistons each having a cylindrical side wall and first and second end walls, the first and second pistons each containing a channel in its side wall extending between its first and second end walls; and means for moving said spool-shaped element within the chamber.

4. The fluid flow divider of claim 3 wherein:

the chamber within said housing is circular in cross section;

the first and second pistons of said spool-shaped element are each circular in cross section;

the channel in the side wall of each of the first and second pistons is helical in configuration; and said means for moving said spool-shaped element within the chamber comprises the threaded projection connected to said spool-shaped element and extending through a threaded hole in said housing, the threads on said threaded projection mating with threads in said housing.

5. The fluid flow divider of claim 3 further including fluid operated means connected to the first and third fluid passages in said housing, said fluid operated means being operable to respond to signals produced in the first and third fluid passages.

6. The fluid flow divider of claim 5 wherein said fluid operated means comprises:

a proportional fluid amplifier having a power nozzle for issuing a fluid stream, a plurality of outlet passages for receiving the fluid stream and a plurality of control ports positioned intermediate to the power nozzle and the outlet passages for providing fluid signals operable to control the fluid stream in the outlet passages;

supply means connected to the power nozzle of said proportional fluid amplifier and the second fluid passage in said housing, said supply means being adapted to transmit fluid to said proportional fluid amplifier and said housing;

means connecting the first fluid passage in said housing to a control port of said proportional fluid amplifier;

means connecting the third fluid passage in said housing to a control port of said proportional fluid amplifier; and output means connected to the outlet passages of said proportional fluid amplifier.

References Cited

UNITED STATES PATENTS

| | | | |
|---|---|---|---|
| 2,833,311 | 5/1958 | Baldelli | 138—43 |
| 2,840,096 | 6/1958 | Du Bois | 138—43 |
| 3,072,147 | 1/1963 | Allen et al. | 137—81.5 |
| 3,124,999 | 3/1964 | Woodward | 137—81.5 XR |
| 3,148,703 | 9/1964 | Kachline | 137—608 |
| 3,150,686 | 9/1964 | Kachline | 137—608 |
| 3,187,763 | 6/1965 | Adams | 137—81.5 |
| 3,390,611 | 7/1968 | Warren | 137—81.5 XR |
| 3,407,828 | 10/1968 | Jones | 137—81.5 |
| 3,410,291 | 11/1968 | Boothe et al. | 137—81.5 |

SAMUEL SCOTT, Primary Examiner

UNITED STATES PATENT OFFICE

CERTIFICATE OF CORRECTION

June 2, 1970

Patent No. 3,515,161

Holger C. Kent

It is certified that error appears in the above identified patent and that said Letters Patent are hereby corrected as shown below:

Column 9, line 8, "of the channel said first port, the second ent por-" should read -- of the channel in said first piston and the first port, the second end por- --.

Signed and sealed this 23rd day of February 1971.

(SEAL)

Attest:

Edward M. Fletcher, Jr.

Attesting Officer

WILLIAM E. SCHUYLER, JR.

Commissioner of Patents